July 21, 1925.
I. T. THORN
VEHICLE DOOR
Filed July 3, 1924
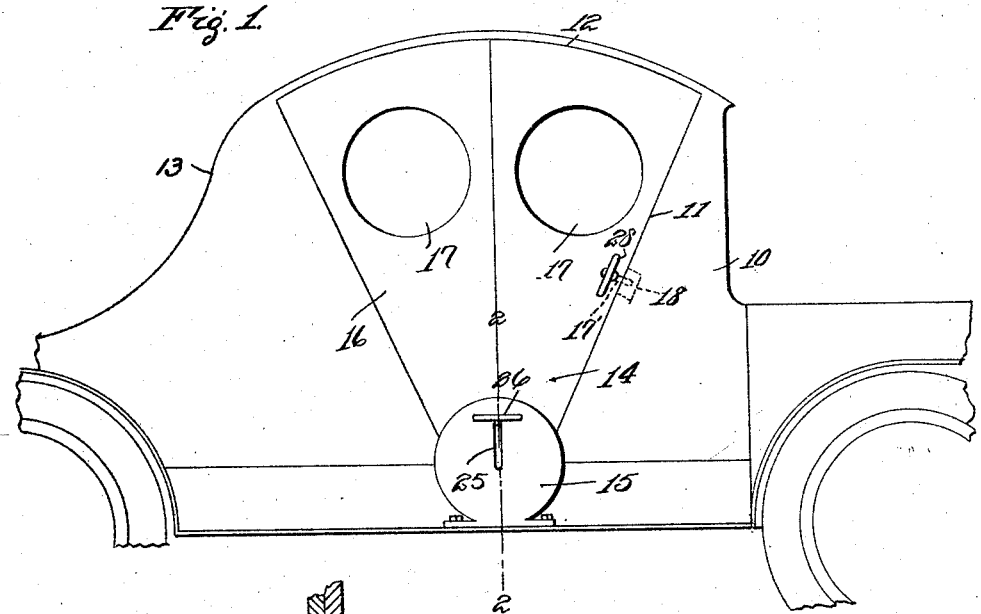
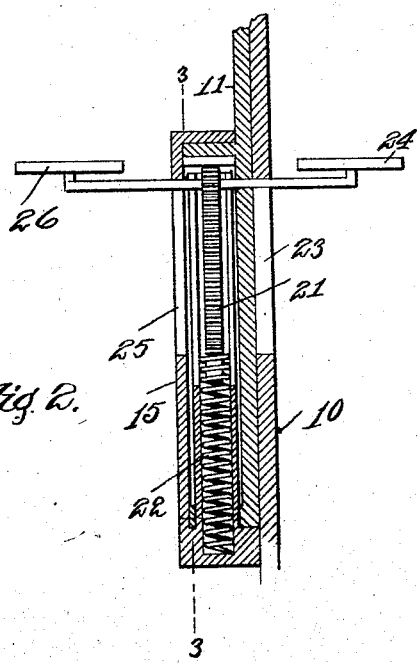
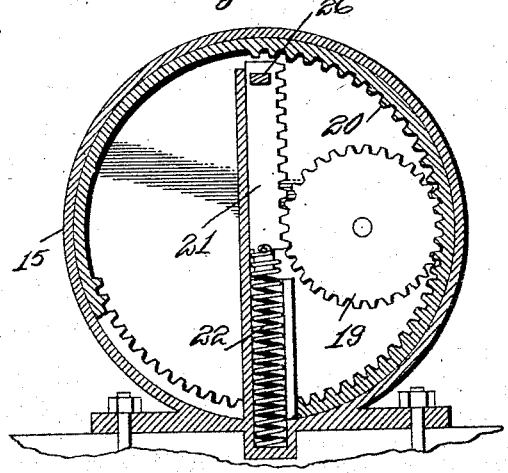
Inventor
Isaac T. Thorn.

Patented July 21, 1925.

1,547,083

UNITED STATES PATENT OFFICE.

ISAAC T. THORN, OF BAKER, MINNESOTA.

VEHICLE DOOR.

Application filed July 3, 1924. Serial No. 724,116.

*To all whom it may concern:*

Be it known that I, ISAAC T. THORN, a citizen of the United States, residing at Baker, in the county of Clay, State of Minnesota, have invented certain new and useful Improvements in Vehicle Doors; and I do hereby declare the following to be a full, clear, and exact description of the invention, such as will enable others skilled in the art to which it appertains to make and use the same.

This invention relates to new and useful improvements in doors, and particularly to doors for motor vehicles.

One object of the invention is to provide a door for a motor vehicle which is adapted to be opened by the foot, from within or without the vehicle.

Another object is to provide a vehicle door which is arranged to swing in a vertical plane from closed to open position, and vice versa.

Another object is to provide a door of this character which is normally and yieldably held in closed position, and which will return to closed position when the opening means is released.

Other objects and advantages will be apparent from the following description when taken in connection with the accompanying drawing.

In the drawing:

Figure 1 is a side elevation of a portion of an automobile, showing the same equipped with the present door, the door being in closed position.

Figure 2 is an enlarged vertical sectional view on the line 2—2 of Figure 1.

Figure 3 is a vertical sectional view on the line 3—3 of Figure 2.

Referring particularly to the accompanying drawing, 10 represents the body of an automobile of the coupé type having an entrance opening 11, in the side wall thereof, of approximately triangular outline, and with its narrower end adjacent the floor of the automobile. The upper end of this opening 11 is arcuate, and is struck from the center of the lower end of the opening. The top of the body is correspondingly curved, as shown at 12, and continues downwardly and rearwardly along a compound curved line, as indicated at 13. The rear portion of the side wall is preferably hollow to receive the approximately triangular door 14, which is mounted to move across the opening 11. The lower end of this door is circular and in the form of a casing, as shown at 15. This door normally occupies one-half of the opening 11, when in closed position, and when in open position, overlies the correspondingly shaped wall 16, said door and said wall being provided with the windows 17. The forward edge of the door is provided with a latch 17', which is arranged to engage a keeper 18, in the forward edge of the opening 11.

Fixed within the lower portion of the opening 11, and rotatable within the casing 15, is a gear 19, which engages with an arcuate rack 20, carried by the casing. Engaged with the gear is a vertically reciprocable rack bar 21, and carried thereby, and engaged with the lower wall of the opening 11, is a spring 22, which normally urges the rack bar upwardly. Carried by the inner face of the rack bar 21, and extending into the automobile, through a vertical slot 23, is a pedal member 24, and correspondingly carried by the outer face of the rack bar, and extending through a vertical slot 25, outwardly of the said automobile, is a second pedal member, shown at 26. By placing the foot on either of these pedal members, and pressing downwardly thereon, the rack bar 21 will be moved downwardly, to cause the gear 19 to rotate and act upon the rack 20 to swing the door into open position. Thus the door may be swung into open position from the outside or the inside of the automobile. The spring 22 is of sufficient strength to move the door into closed position, and maintain the same in such position. The latch is provided with a releasing handle 28, outside of the automobile, and a similar handle (not shown), on the inside, whereby the latch may be released from without or from within.

What is claimed is:

1. The combination with an automobile body, said body having an approximately triangular entrance opening, an approximately triangular door movable transversely of the said opening, said door being mounted at its lower end, and operating means associated with the said lower end of the door and operated pedally from within and from without the body.

2. The combination with an automobile body having an entrance opening approximately triangular in outline, a triangular door disposed in the opening and being movably supported at its lower end, a rack on the lower end of the door, a gear operatively engaged with the rack, and a foot operated rack member operatively engaged with the gear.

3. The combination with an automobile body having an approximately triangular entrance opening, a correspondingly formed door pivotally mounted in the opening at its lower end, an arcuate rack carried by the door, a gear carried by the body and engaged with the rack, and a reciprocable spring pressed rack engaged with the gear.

4. The combination with an automobile body having an entrance opening, a door disposed in the opening and pivotally supported at its lower end in the opening, and operating means comprising a rack on the lower end of the door, a gear operatively engaged with the rack, and a foot operated rack member operatively engaged with the gear.

In testimony whereof, I do affix my signature, in the presence of two witnesses.

ISAAC T. THORN.

Witnesses:
O. N. IVERSON,
GEORGE C. GARVEN.